United States Patent [19]

Imanari et al.

[11] Patent Number: 4,833,113

[45] Date of Patent: May 23, 1989

[54] DENITRATION CATALYST FOR REDUCING NITROGEN OXIDES IN EXHAUST GAS

[75] Inventors: Makoto Imanari; Takeo Koshikawa, both of Ami; Akihiro Yamauchi, Koganei; Masayuki Hanada, Kitakyushu; Morio Fukuda, Kitakyushu; Kiyoshi Nagano, Kitakyushu, all of Japan

[73] Assignees: Mitsubishi Petrochemical Co., Ltd.; Mitsubishi Jukogyo Kabushiki Kaisha; Catalyst and Chemicals Industries, Co., Ltd., all of Tokyo, Japan

[21] Appl. No.: 122,949

[22] Filed: Nov. 19, 1987

[30] Foreign Application Priority Data

Nov. 19, 1986 [JP] Japan .................................. 61-273854

[51] Int. Cl.$^4$ ..................... B01J 21/06; B01J 23/22; B01J 23/30
[52] U.S. Cl. ..................................... 502/309; 423/239
[58] Field of Search .................... 502/309; 423/239 A

[56] References Cited

U.S. PATENT DOCUMENTS 4,085,193 4/1978 Nakajima et al. .............. 502/309 X
4,518,710 5/1985 Brennan ............................. 502/309

Primary Examiner—W. J. Shine
Attorney, Agent, or Firm—Wenderoth, Lind & Ponack

[57] ABSTRACT

A denitration catalyst comprising an oxide of titanium, an oxide of tungsten and an oxide of vanadium as catalytically active ingredients and having a specific surface area, measured by the BET method, of 80 to 200 m$^2$/g and a pore volume, measured by the mercury penetration method, of 0.1 to 0.5 cc/g.

9 Claims, 1 Drawing Sheet

DENITRATION CATALYST FOR REDUCING NITROGEN OXIDES IN EXHAUST GAS

BACKGROUND OF THE INVENTION

This invention relates to a denitration catalyst for reducing nitrogen oxides in an exhaust gas with a reducing gas such as ammonia and thus render them non-toxic. More specifically, it relates to a catalyst which even when the exhaust gas contains an arsenic compound, can continue to have reducing activity on nitrogen oxides over a long period of time without being readily poisoned by the arsenic compound.

Methods have been known to reduce nitrogen oxides (to be sometimes referred to as $NO_x$) contained in exhaust gases from various fixed generation sources, particularly exhaust gases from various combustion furnaces such as a boiler, by contacting them with reducing gases such as ammonia and thus render them non-toxic.

Various catalysts heretofore known for use in such methods have problems still desired to be solved in regard to activity, strength and cost, and also to durability to sulfur compounds, arsenic compounds, etc. contained in the exhaust gases. Particularly, when the exhaust gases contain arsenic compounds, most of the catalysts are poisoned by the arsenic compounds and rapidly lose activity during use.

Arsenic compounds have long been known to be activity poisoning substances against catalysts used in various reactions. A typical poisoning action of arsenic compounds is seen in hydrogenation reaction with a platinum or palladium catalyst in the liquid phase or a reaction of synthesizing anhydrous sulfuric acid from $SO_2$ using a vanadium pentoxide catalyst.

This catalyst poisoning action of arsenic compounds is similarly observed in the reaction of reducing $NO_x$ in exhaust gases to render them non-toxic. Many denitration catalysts rapidly lose activity in the presence of arsenic compounds in exhaust gases and become industrially useless.

Boiler exhaust gases from burning of coal, heavy oils, etc. as fuels and exhaust gases of a glass melting furnace frequently contain arsenic compounds. One example of a particularly high arsenic content is in a boiler exhaust gas resulting from burning of coal occurring in Europe.

Many of the catalysts previously proposed for use in reducing $NO_x$ in exhaust gases with reducing gases and thus rendering them non-toxic have the disadvantage of undergoing poisoning by arsenic compounds in the exhaust gases and rapidly losing $NO_x$ reducing activity.

The active lifetime of catalyst greatly affects the smooth operation of the apparatus and the economy of the denitration process, and it cannot be denied that the short catalyst life is very disadvantageous in industrial operations.

SUMMARY OF THE INVENTION

It is an object of this invention to provide a denitration catalyst.

Another object of this invention is to provide an industrially advantageous catalyst which is not readily poisoned by an arsenic compound and retains high activity over a long period of time when used in reducing $NO_x$ in an exhaust gas containing the arsenic compound.

Other objects of the invention along with its advantages will become apparent from the following description.

According to this invention, the above objects and advantages of the invention are achieved by a denitration catalyst comprising an oxide of titanium, an oxide of tungsten and an oxide of vanadium as catalytically active ingredients and having a specific surface area, measured by the BET method, of 80 to 200 m²/g and a pore volume, measured by the mercury penetration method, of 0.1 to 0.5 cc/g.

BRIEF DESCRIPTION OF THE DRAWING

The accompanying drawing.

DETAILED DESCRIPTION OF THE INVENTION

Figure 1:
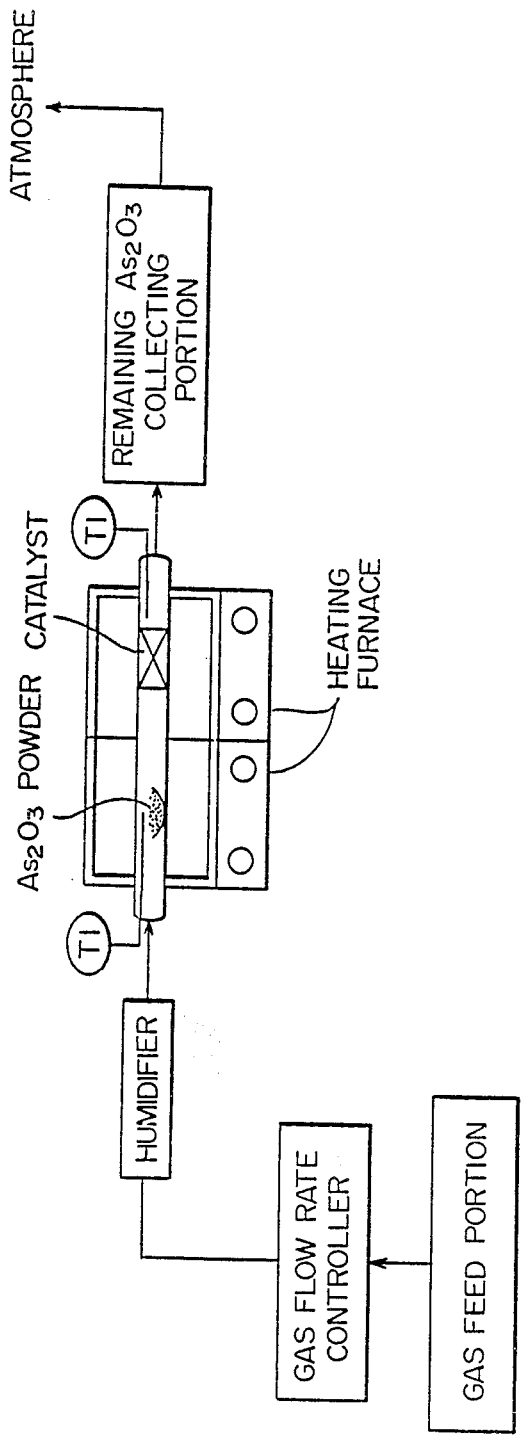
FIG. 1, is a schematic view of a forced arsenic degradation device for testing the arsenic poisoning resistance of the catalyst of this invention.

The denitration catalyst of this invention comprises an oxide of titanium, an oxide of tungsten and an oxide of vanadium oxide as catalytically active ingredients.

Titanium oxide, titanium tetrachloride, titanium sulfate, titanyl sulfate ($TiOSO_4$), and metatitanic acid, for example, may be used as a raw material for preparation of the titanium component.

Examples of a raw material for the tungsten component include tungsten oxide, tungstic acid, ammonium paratungstate and ammonium metatungstate.

Examples of a raw material for the vanadium component are oxides such as $V_2O_5$, chlorides such as $VCl_3$, oxychlorides such as $VOCl_3$ and ammonium salts such as $NH_4VO_3$.

The catalyst of this invention can basically be produced by applying the known methods used in the production of denitration catalysts of this type. For molding the final catalyst, extrusion, tumbling granulation, tableting, and other ordinary methods may be selected according to the end use of the catalyst.

The denitration catalyst of this invention has a specific surface area, measured by the BET method, of 80 to 200 m²/g, preferably 100 to 170 m²/g, and a pore volume, measured by the mercury penetration method, of 0.1 to 0.5 cc/g, preferably 0.2 to 0.4 cc/g.

High $NO_x$ reducing activity and excellent resistance to arsenic poisoning can be achieved by the catalyst of this invention having the aforesaid specific surface area and pore volume.

Preferably, the catalyst of this invention contains 40 to 99% by weight of the oxide of titanium, the oxide of tungsten and the oxide of vanadium.

Preferably, the catalyst of this invention contains 50 to 99% by weight of the oxide of titanium as $TiO_2$, 0.5 to 50% by weight of the oxide of tungsten as $WO_3$, and 0.1 to 5% by weight of $V_2O_5$ as $V_2O_5$, based on the total weight of these three components.

Investigations of the present inventors have shown that preferably, the above specific surface area and pore volume of the catalyst of this invention are satisfied by a pore distribution containing both a group of micropores having a pore diameter smaller than 100 Å and a group of macropores having a pore diameter of 100 Å to $1 \times 10^5$ Å. The reason for this is not entirely clear, but is presumed to be as follows.

Since the $NO_x$ reducing reaction has a relatively high rate of reaction, the time of contact of the catalyst with the exhaust gas is generally short. Under these reaction conditions, the reaction which proceeds on the surface of the inner walls of relatively large pores (macropores) is predominant with respect to the rate of reaction over the reaction which proceeds on the surface of the inner walls of fine pores (micropores) because there is a difference in the rate of diffusion within the pores. This leads to the anticipation that active sites existing on the surface of the inner walls of the micropores will not so effectively be involved in the reaction and therefore, even when the active sites of the catalyst on the micropores are covered with an arsenic component in the exhaust gas, its effect on the overall catalyst activity will be small. The present inventors, however, have found after studying various catalysts by an arsenic forced degradation test to be described hereinafter that a catalyst containing more micropores shows higher ability to permit absorption of $As_2O_3$. On the basis of this experimental fact, the excellent resistance of the catalyst of this invention to arsenic poisoning is presumably because the arsenic compound is adsorbed on the surface of the inner walls of the micropores which are believed to be not so much involved in the reaction, and in the meantime, the reaction proceeds substantially on the surface of the inner walls of the macropores which are believed to be greatly involved in the reaction.

The present invention was accomplished on the basis of the above finding and idea, and such finding and idea have not been known in the past. The mechanism of poisoning of denitration catalyst by an arsenic compound may be considered as follows with reference to the mechanisms already disclosed with regard to other types of reaction. It is known that an arsenic component contained in a fuel changes to $As_2O_3$ during combustion, and $As_2O_3$ exists as $As_4O_6$ at temperatures below 800° C. in view of its vapor density. It is therefore thought that in an ordinary denitration reaction temperature range, the arsenic component reaches the surface of the catalyst as $As_4O_6$ and diffuses and intrudes into the inside of the pores from the catalyst surface, and by a capillary condensing action or by reaction or chemical adsorption with the catalyst ingredients, the arsenic compounds deposit stably in the inside of the pores and covers the active sites of the catalysts thereby to reduce the activity of the catalyst. However, when the property of being resistant to adsorption of arsenic oxide was imparted to the catalyst, the catalyst had reduced activity although the arsenic oxide was not easily adsorbed on it. No catalyst having high activity and excellent resistance to arsenic poisoning could be obtained.

The denitration catalyst of the invention containing micropores and macropores can be produced, for example, by using a carrier component having many micropores having a pore diameter smaller than 100 Å and solid particles which are burnt, volatilized or decomposed during calcination to give pores having a pore diameter of 100 to $1 \times 10^5$ Å together in the catalyst preparation.

Examples of the carrier component containing many micropores having a pore diameter smaller than 100 Å include natural and synthetic zeolites, silica-alumina, silica-magnesia, silica-alumina-magnesia, silica, titaniasilica, and activated carbon. Carrier components having an average pore diameter of not more than 50 Å are especially effective.

Examples of suitable solid particles which can be burnt, volatilized or decomposed during calcination of the catalyst and thus removed include microcrystalline cellulose, resins such as acrylic resins, polypropylene and polyamides, lactose, corn starch and wheat flour. These solid particles are used as particles having such a size that upon calcination, they give macropores having a particle diameter of 100 Å to $1 \times 10^5$ Å, especially at least 100 Å, which greatly affect the denitration activity, for example as particles having a size of about 1 to 100 micrometers or as short fibers having a diameter of, for example, 10 to 30 micrometers and a length of about 1 to 5 mm. These particles or fibers (additives) are added in a stage before catalyst molding.

The macropores can also be provided by a method in which part of the catalyst constituent ingredients is kneaded, dried, calcined and pulverized to create a condition in which moderate spaces exist among the particles, and the remaining ingredients are mixed in a suitable stage of the catalyst production process, or by a method in which the aforesaid solid particles are used by the aforesaid method.

The micropores are very useful for imparting arsenic poisoning resistance to the catalyst, and are provided in the catalyst by including 1 to 60% by weight, preferably 10 to 30% by weight, based on the total weight of the catalyst ingredients, of a carrier component containing many micropores preferably having a size not more than 10 Å.

Preferably, in the catalyst of this invention, 30 to 70% of its BET specific surface area is accounted for by the micropores. In other words, the catalyst of this invention preferably contains micropores of which BET specific surface area accounts for 30 to 70% of the entire specific surface area of the catalyst and of which size cannot be measured by the mercury penetration method, in addition to the pores of which size can be measured by the mercury penetration method.

As stated above, the catalyst of this invention has excellent arsenic poisoning resistance and $NO_x$ reducing activity on exhaust gases containing an arsenic component in an amount of, for example, at least about 0.001 ppm, preferably at least about 0.01 ppm to about 1 ppm as $As_2O_3$, and is used conveniently under the following conditions, for example.

The catalyst of this invention is set up in a passage for an exhaust gas, and the exhaust gas and a reducing gas such as ammonia are passed at a space velocity (SV) of about 2,000 to 50,000 $hr^{-1}$.

The contacting of the reaction gas is carried out at a temperature of preferably 100° to 550° C., more preferably 200° to 500° C., under a pressure of preferably atmospheric pressure to about 10 $kg/cm^2$.

The following examples illustrate the present invention more specficially.

The resistance of the catalyst to poisoning by an arsenic compound was evaluated by an arsenic poisoning resistance test described below.

Test for Arsenic Poisoning Resistance

By a device for forcedly degrading the catalyst by arsenic as shown in FIG. 1 of the accompanying drawings, the catalyst was contacted with a gas containing $As_2O_3$, and after the lapse of a predetermined period of time, the catalyst was taken out.

The NO reducing activity of the so degraded catalyst and that of the non-degraded catalyst were measured under the following conditions, and from the degree of decrease of activity, the poisoning resistance to arsenic trioxide was evaluated.

The catalyst treating temperature in the above degrading device can be set at any value within the range of temperatures at which the catalyst is actually used in a $NO_x$ reducing device. The temperature at which $As_2O_3$ powder is heated is set according to the required concentration of $As_2O_3$. Usually, the desired $As_2O_3$ concentration can be obtained at temperatures within the range of 200° to 400° C.

Forced degradation of the catalyst by arsenic in the following Examples and Comparative Examples was carried out under the following conditions.
Catalyst temperature: 380° C.
Time: 10 hours
Gas flow rate: 2 liters/min.
Gas composition: about 25 ppm of $As_2O_3$, 1000 ppm of $SO_2$, 5% of $O_2$, 10% of $H_2O$, and the balance $N_2$.

The NO reducing activity was evaluated under the following conditions.
Reactor: quartz reaction tube with an inside diameter of 20 mm
Amount of the catalyst: 20 ml (size 6 mm $\phi \times 6$ mm)
Gas flow rate: 400 Nl/hr (SV: 20000 hr$^{-1}$)
Reaction temperature: 380° C.
Gas composition: 100 ppm of NO, 100 ppm of $NH_3$, 800 ppm of $SO_2$, 4% of $O_2$, 12% of $CO_2$, 9% of $H_2O$ and balance $N_2$.

For analysis of NO, the concentration of NO at the introducing part and the exist part of the reactor are measured by using a $NO/NO_x$ analyzer (Model 951, made by Toshiba-Beckmann Co., Ltd.) in accordance with the chemiluminescence detecting method.

The NO removal ratio used in this invention is defined as follows:

$$\text{NO removal ratio (\%)} = \frac{\text{NO concentration at the introducing portion (ppm)} - \text{NO concentration at the outlet portion (ppm)}}{\text{NO concentration at the introducing portion (ppm)}} \times 100$$

The specific surface area (S.A.) measured by the PET method in the present specification was measured by using a device (QS-8 type, supplied by QUANTA-CHROME, U.S.A.) and $N_2$ gas as an adsorption gas.

The pore distribution (P.D.) and pore volume (P.V.) were measured by the mercury penetration method by using a porosimeter (type 200, supplied by Carlo Erba Strumentazione, Italy).

EXAMPLE 1

Aqueous ammonia having a $NH_3$ content of 25% was added to 720 g of a slurry of metatitanic acid ($TiO_2$ content 30% by weight) to adjust the pH of the slurry to 8.5. A powder of ammonium paratungstate (27 g) was added, and they were kneaded for 2 hours in the wet state. The kneaded mixture was dried and calcined at 680° C. for 5 hours to obtain a powder of titanium oxide and tungsten oxide.

An aqueous solution of ammonium metavanadate was added to this powder in an amount of 0.7% by weight as $V_2O_5$. After thorough mixing, the mixture was dried and calcined at 450° C. for 4 hours to give a powder (A) composed of titanium oxide, tungsten oxide and vanadium oxide.

Two hundred grams of the powder A was kneaded in a kneader with 50 g of Y-type zeolite (cation: $NH_4$) having an S.A. of 610 m$^2$/g and a P.V. of 0.33 cc/g, 5 g of carboxymethyl cellulose, 2.5 g of polyethylene oxide and 2.5 g of organic fibers having a diameter of about 20 microns and a length of about 3 mm together with a moderate amount of water for 30 minutes. The kneaded mixture was extruded to form an extrudate having a diameter of 6 mm. It was dried and then calcined at 500° C. for 5 hours.

The resulting catalyst showed an S.A. of 125 m$^2$/g and a P.V. of 0.31 cc/g.

The catalyst was subjected to the forced arsenic degradation test, and its NO removal ratios before and after poisoning were measured. The results are as follows:
Before forced degradation: 87.7%
After forced degradation: 85.3%

EXAMPLE 2

Two hundred grams of the same powder as powder A used in Example 1 was kneaded in a kneader with 50 g of synthetic zeolite (molecular sieve 13×) having an S.A. of 720 m$^2$/g and a P.V. of 0.35 cc/g, 5 g of carboxymethyl cellulose, 2.5 g of polyethylene oxide and 2.5 g of organic fibers having a diameter of about 20 microns and a length of about 3 mm together with a moderate amount of water for 30 minutes. The kneaded mixture was extruded to form an extrudate having a diameter of 6 mm. It was dried, and calcined at 500° C. for 5 hours. The resulting catalyst showed an S.A. of 158 m$^2$/g and a P.V. of 0.20 cc/g. The NO removal ratios of the catalyst before and after forced degradation by arsenic were as follows:
Before forced degradation: 82.6%
After forced degradation: 80.7%

EXAMPLE 3

A catalyst was prepared substantially in accordance with Example 1 except that 250 g of water dispersed colloidal silica ($SiO_2$ content 20% by weight) was used as a carrier component.

The used colloidal silica, when dried at 120° C., showed an S.A. of 180 m$^2$/g and a P.V. of 0.07 cc/g.

The resulting catalyst showed an S.A. of 127 m$^2$/g and a P.V. of 0.36 cc/g. Its NO removal ratios before and after forced degradation by arsenic were as follows:
Before forced degradation: 84.1%
After forced degradation: 81.9%

EXAMPLES 4–6

Catalysts were prepared as in Example 1 except that the type of the carrier component was changed. The properties of the catalysts and their NO removal ratios before and after forced degradation by arsenic were measured, and the results are shown in Table 2.

The carriers used are shown in Table 1. Each of carrier components was added in an amount of 20% by weight.

TABLE 1

| Example | Type of the carrier | S.A. (m$^2$/g) | P.V. (cc/g) |
|---|---|---|---|
| 4 | silica-alumina | 440 | 0.53 |
| 5 | silica-magnesia | 650 | 0.37 |
| 6 | silica-alumina-magnesia | 530 | 0.56 |

TABLE 2

| | Properties of the catalyst | | No removal ratio (%) | |
|---|---|---|---|---|
| Example | S.A. (m$^2$/g) | P.V. (cc/g) | Before forced degradation | After forced degradation |
| 4 | 103 | 0.37 | 78.8 | 76.2 |
| 5 | 122 | 0.34 | 81.6 | 79.3 |

TABLE 2-continued

| Example | Properties of the catalyst S.A. (m²/g) | P.V. (cc/g) | No removal ratio (%) Before forced degradation | After forced degradation |
|---|---|---|---|---|
| 6 | 110 | 0.39 | 82.1 | 80.4 |

COMPARATIVE EXAMPLE

A catalyst containing no carrier component was prepared as in Example 1 except that the Y-type zeolite was not added. The resulting catalyst had an S.A. of 69 m²/g and a P.V. of 0.33 cc/g. Its NO removal ratios before and after forced degradation were as follows:
Before forced degradation: 79.0%
After forced degradation: 53.3%

What is claimed is:

1. A denitration catalyst comprising an oxide of titanium, an oxide of tungsten and an oxide of vanadium as catalytically active ingredients and having a specific surface area, measured by the BET method, of 80 to 200 m²/g and a pore volume, measured by the mercury penetration method, of 0.1 to 0.5 cc/g.

2. The catalyst of claim 1 wherein the specific surface area of the catalyst is 100 to 170 m²/g.

3. The catalyst of claim 1 wherein the pore volume of the catalyst is 0.2 to 0.4 cc/g.

4. The catalyst of claim 1 which contains both a group of micropores having a pore diameter smaller than 100 Å and a group of macropores having a pore diameter of 100 Å to $1 \times 10^5$ Å.

5. The catalyst of claim 4 wherein 30 to 70% of the specific surface area of the catalyst is accounted for by the specific surface area of said group of micropores.

6. The catalyst of claim 1 wherein the content of the oxide of titanium, the oxide of tungsten and the oxide of vanadium is 40 to 99% by weight.

7. The catalyst of claim 1 wherein the amount of the oxide of titanium is 50 to 99% by weight based on the total weight of the oxide of titanium, the oxide of tungsten and the oxide of vanadium.

8. The catalyst of claim 1 wherein the amount of the oxide of tungsten is 0.5 to 50% by weight based on the total weight of the oxide of titanium, the oxide of tungsten and the oxide of vanadium.

9. The catalyst of claim 1 wherein the amount of the oxide of vanadium is 0.1 to 5% by weight based on the total weight of the oxide of titanium, the oxide of tungsten and the oxide of vanadium.

* * * * *